US012773991B2

(12) United States Patent
Choi

(10) Patent No.: US 12,773,991 B2
(45) Date of Patent: Oct. 27, 2026

(54) APPARATUS FOR CONTROLLING AUTONOMOUS DRIVING AND METHOD THEREOF

(71) Applicants: Hyundai Motor Company, Seoul (KR); Kia Corporation, Seoul (KR)

(72) Inventor: Su Young Choi, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 368 days.

(21) Appl. No.: 18/532,427

(22) Filed: Dec. 7, 2023

(65) Prior Publication Data

US 2025/0010852 A1 Jan. 9, 2025

(30) Foreign Application Priority Data

Jul. 7, 2023 (KR) ........................ 10-2023-0088440

(51) Int. Cl.
*B60W 30/12* (2020.01)
*B60W 40/072* (2012.01)
*B60W 60/00* (2020.01)

(52) U.S. Cl.
CPC .......... *B60W 30/12* (2013.01); *B60W 40/072* (2013.01); *B60W 60/001* (2020.02); *B60W 2300/145* (2013.01); *B60W 2520/22* (2013.01); *B60W 2552/30* (2020.02); *B60W 2552/53* (2020.02)

(58) Field of Classification Search
CPC ................. B60W 30/12; B60W 30/16; B60W 30/18145; B60W 40/072; B60W 2300/14; B60W 2554/801; B60W 2554/802
See application file for complete search history.

(56) References Cited

U.S. PATENT DOCUMENTS

2021/0123750 A1* 4/2021 Im ..................... B60W 60/0015
2022/0073098 A1* 3/2022 D'Orazio .............. B60W 50/14
(Continued)

FOREIGN PATENT DOCUMENTS

CN 118176140 A * 6/2024 ............ B60W 30/10
CN 119095755 A * 12/2024 ...... B60W 30/18163
KR 102872108 B1 * 10/2025 ........... G06V 20/588

OTHER PUBLICATIONS

Oliveira, Rui, Ljungqvist, Oskar, Lima, Pedro F., and Wahlberg, Bo, "Optimization-Based On-Road Path Planning for Articulated Vehicles," IFAC-PapersOnLine53.2 (2020), pp. 15572-15579.

*Primary Examiner* — John Kwon
(74) *Attorney, Agent, or Firm* — Banner & Witcoff, Ltd.

(57) ABSTRACT

An apparatus is introduced for an autonomous driving control. The apparatus may comprise a sensor device, a memory configured to store instructions, and a controller operatively connected to the sensor device and the memory, wherein the instructions, when executed by the controller, may cause the apparatus to determine, based on a driving route, curvature of a driving road on which a vehicle is driving, determine, by the sensor device and based on the curvature exceeding a threshold curvature, information associated with at least one of the driving road, lines of the driving road, a feature of the vehicle, or a kingpin angle between bodies of the vehicle, generate a biased driving route based on at least one of the determined information or the driving route, and control the vehicle to drive on the driving road along the biased driving route.

20 Claims, 10 Drawing Sheets

(56) References Cited

U.S. PATENT DOCUMENTS

| | | | | |
|---|---|---|---|---|
| 2024/0383496 | A1 * | 11/2024 | Choi | B60W 60/0013 |
| 2025/0050906 | A1 * | 2/2025 | Lee | B60W 60/0011 |
| 2025/0065910 | A1 * | 2/2025 | Choi | B60W 60/001 |
| 2025/0206339 | A1 * | 6/2025 | Lee | B60W 60/001 |

* cited by examiner

APPARATUS FOR CONTROLLING AUTONOMOUS DRIVING AND METHOD THEREOF

CROSS-REFERENCE TO RELATED APPLICATION

This application claims the benefit of priority to Korean Patent Application No. 10-2023-0088440, filed in the Korean Intellectual Property Office on Jul. 7, 2023, the entire contents of which are incorporated herein by reference.

TECHNICAL FIELD

The present disclosure relates to an autonomous driving control apparatus and a method thereof, and more particularly, relate to a technology for generating a deflection driving route to safely control the driving of a host vehicle including bodies in a section having high curvature.

BACKGROUND

An autonomous driving may be classified into partially autonomous driving, conditionally autonomous driving, highly autonomous driving, and/or fully autonomous driving depending on a control level.

Meanwhile, types (or kinds) of vehicles controlled by the autonomous driving control apparatus may vary. For example, the autonomous driving control apparatus may control the driving of a vehicle equipped with two or more bodies that include a tractor and/or a trailer.

For example, in a process in which the autonomous driving control apparatus controls the driving of a host vehicle, a part of at least one body included in the host vehicle may deviate from the center of a lane, on which the host vehicle is driving, by more than a specific distance depending on the type of the host vehicle.

For example, while the host vehicle including a tractor and/or a trailer is driving under the control of the autonomous driving control apparatus, the tractor may be driving appropriately within a specified range (e.g., a safety range) based on the center of a driving lane. On the other hand, the trailer, which is physically separated from the tractor, may collide with adjacent structures or other vehicles by driving beyond (or deviates from) the specified range from the center of the driving lane. This problem may be defined as off tracking.

Furthermore, if the host vehicle including the tractor and/or the trailer is driving in a section (e.g., a junction (JC) section of a high-speed road) have relatively high curvature, the possibility of risk occurring due to off-tracking may increase.

SUMMARY

According to the present disclosure, an apparatus may comprise a sensor device, a memory configured to store instructions, and a controller operatively connected to the sensor device and the memory, wherein the instructions, when executed by the controller, may cause the apparatus to determine, based on a driving route, curvature of a driving road on which a vehicle is driving, determine, by the sensor device and based on the curvature exceeding a threshold curvature, information associated with at least one of the driving road, lines of the driving road, a feature of the vehicle, or a kingpin angle between bodies of the vehicle, generate a biased driving route based on at least one of the determined information or the driving route, and control the vehicle to drive on the driving road along the biased driving route.

The apparatus, wherein the information associated with the lines may comprise a left line and a right line based on a driving direction of the vehicle, and wherein the instructions, when executed by the controller, may cause the apparatus to based on the vehicle continuing to drive on the driving route and the determined information, determine expected distances between the bodies of the vehicle and the left line, and between the bodies of the vehicle and the right line, and generate the biased driving route based on the expected distances.

The apparatus, wherein the expected distances comprise at least one of a first distance between the left line and a first body of the vehicle, a second distance between the left line and a second body of the vehicle, a third distance between the right line and the first body of the vehicle, or a fourth distance between the right line and the second body of the vehicle.

The apparatus, wherein the instructions, when executed by the controller, may cause the apparatus to determine optimization state information may comprise at least one of a location lateral error, a heading error, the kingpin angle, a curvature for a location of the driving road, a curvature change amount, or a biased distance based on the driving route, wherein the biased distance is associated with each of the bodies based on at least one of the determined information or the driving route, and generate the biased driving route based on at least part of the optimization state information.

The apparatus, wherein the kingpin angle may comprise an angle formed between a first heading direction of a first body and a second heading direction of a second body, wherein the first and second bodies are among the bodies at a point on the biased driving route. The apparatus, wherein the instructions, when executed by the controller, may cause the apparatus to determine the optimization state information further based on a predefined maximum value and a predefined minimum value that are based on at least one of the location lateral error, the heading error, the kingpin angle, the curvature for the location, the curvature change amount, or the biased distance.

The apparatus, wherein the instructions, when executed by the controller, may cause the apparatus to determine that the vehicle is driving along the biased driving route based on at least one of a first location lateral error of a first body of the bodies satisfying a condition, a second location lateral error of a second body of the bodies satisfying the condition, or a first heading error of the second body satisfying the condition.

The apparatus, wherein the instructions, when executed by the controller, may cause the apparatus to determine, based on at least one of the determined information or the driving route, at least one of a first offset state for a first body of the bodies, or a second offset state for a second body of the bodies, and generate, based on at least one of the first offset state or the second offset state, the biased driving route so that the biased driving route is adjacent to a center of the driving road.

According to the present disclosure, a method may comprise determining, by a controller and based on a driving route, curvature of a driving road on which a vehicle is driving, based on the curvature exceeding a threshold curvature, information associated with at least one of the driving road, lines of the driving road, a feature of the vehicle, or a kingpin angle between bodies of the vehicle, generating a biased driving route based on at least one of the determined information or the driving route, and controlling the vehicle to drive on the driving road along the biased driving route.

The method, wherein the information associated with the lines may comprise a left line and a right line based on a driving direction of the vehicle, and wherein the generating the biased driving route may comprise based on the vehicle continuing to drive on the driving route and the determined information, determining expected distances between the bodies of the vehicle and the left line, and between the bodies of the vehicle the right line, and generating the biased driving route based on the expected distances.

The method, wherein the generating the biased driving route may comprise determining optimization state information may comprise at least one of a location lateral error, a heading error, a kingpin angle, a curvature for a location of the driving road, a curvature change amount, or a biased distance based on the driving route, wherein the biased distance is associated with each of the bodies based on at least one of the determined information or the driving route, and generating the biased driving route based on at least part of the optimization state information.

The method, wherein the kingpin angle may comprise an angle formed between a first heading direction of a first body and a second heading direction of a second body, wherein the first and second bodies are among the bodies at a point on the biased driving route.

The method, wherein the determining the optimization state information may comprise determining the optimization state information based on a predefined maximum value and a predefined minimum value that are based on at least one of the location lateral error, the heading error, the kingpin angle, the curvature for the location, the curvature change amount, or the biased distance.

The method, may further comprise determining that the vehicle is driving along the biased driving route based on at least one of a first location lateral error of a first body of the bodies satisfying a condition, a second location lateral error of a second body of the bodies satisfying the condition, or a first heading error of the second body satisfying the condition.

The method, wherein the generating the biased driving route may comprise determining, based on at least one of the determined information, at least one of a first offset state for a first body of the bodies or a second offset state for a second body of the bodies, and generating, based on at least one of the first offset state or the second offset state, the biased driving route so that the biased driving route is adjacent to a center of the driving road.

According to the present disclosure, a non-transitory computer-readable recording medium storing a program, when executed, may cause determining, by a controller and based on a driving route, curvature of a driving road on which a vehicle is driving, determining, based on the curvature exceeding a threshold curvature, information associated with at least one of the driving road, both lines of the driving road, a feature of the vehicle, or a kingpin angle between bodies of the vehicle, generating a biased driving route based on at least one of the determined information or the driving route, and controlling the vehicle to drive on the driving road along the biased driving route.

The non-transitory computer-readable recording medium, wherein the information associated with the lines may comprise information associated with a left line and a right line based on a driving direction of the vehicle, and wherein the generating the biased driving route may comprise based on the vehicle continuing to drive on the driving route and the determined information, determining expected distances between the bodies of the vehicle and the left line, and between the bodies of the vehicle the right line, and generating the biased driving route based on the expected distances.

The non-transitory computer-readable recording medium, wherein the generating the biased driving route may comprise determining optimization state information may comprise at least one of a location lateral error, a heading error, a kingpin angle, curvature for each location, a curvature change amount, or a biased distance based on the driving route, wherein the biased distance is associated with each of the bodies based on at least one of the determined information, and generating the biased driving route based on at least part of the optimization state information.

The non-transitory computer-readable recording medium, wherein the determining the optimization state information may comprise determining the optimization state information based on a predefined maximum value and a predefined minimum value that are based on at least one of the location lateral error, the heading error, the kingpin angle, the curvature for each location, the curvature change amount, or the biased distance.

The non-transitory computer-readable recording medium, wherein the program, when executed, may cause determining that the vehicle is driving along the biased driving route based on at least one of a first location lateral error of a first body of the bodies satisfying a condition, a second location lateral error of a second body of the bodies satisfying the condition, or a first heading error of the second body satisfying the condition.

BRIEF DESCRIPTION OF THE DRAWINGS

The above and other objects, features and advantages of the present disclosure will be more apparent from the following detailed description taken in conjunction with the accompanying drawings.

Figure 1:
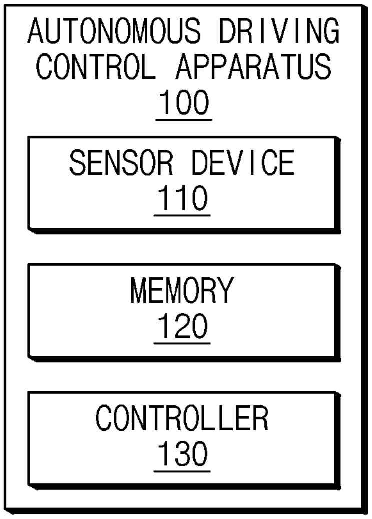
FIG. 1 shows an example of components of an autonomous driving control apparatus, according to an example of the present disclosure.

With regard to description of drawings, the same or similar components will be marked by the same or similar reference signs.

DETAILED DESCRIPTION

Hereinafter, some examples of the present disclosure will be described in detail with reference to the accompanying drawings. In adding reference numerals to components of each drawing, it should be noted that the same components have the same reference numerals, although they are indicated on another drawing. Furthermore, in describing the examples of the present disclosure, detailed descriptions associated with well-known functions or configurations will be omitted if they may make subject matters of the present disclosure unnecessarily obscure.

In describing elements of an example of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

Hereinafter, various examples of the present disclosure will be described in detail with reference to FIGS. 1 to 7.

FIG. 1 shows an example of components of an autonomous driving control apparatus, according to an example of the present disclosure.

According to an example, an autonomous driving control apparatus 100 may include at least one of a sensor device 110, a memory 120, a controller 130, or any combination thereof. The configuration of the autonomous driving control apparatus 100 shown in FIG. 1 is an example, and examples of the present disclosure are not limited thereto. For example, the autonomous driving control apparatus 100 may further include components not shown in FIG. 1 (e.g., at least one of the interface device, a communication device, a display device, a notification device, or any combination thereof).

According to an example, the sensor device 110 may obtain (or sense) various pieces of information used for the driving of a host vehicle.

For example, the sensor device 110 may include at least one sensor including at least one of a camera, radar, LiDAR, or any combination thereof.

For example, the sensor device 110 may determine (or identify) information about at least one of a driving state of the host vehicle, a driving mode of the host vehicle, a driving road of the host vehicle, an area adjacent to the host vehicle, or any combination thereof.

For example, the sensor device 110 may determine (or identify) information about a driving state of the host vehicle, which includes at least one of an actual (or real-time) driving speed of the host vehicle, a driving direction of the host vehicle, a driving acceleration and/or deceleration of the host vehicle, or any combination thereof.

For example, the sensor device 110 may determine (or identify) information about at least one of the real-time curvature of the driving road (or, a driving lane) of the host vehicle, both lines (e.g., a border line between the driving lane and an adjacent lane) of the driving road of the host vehicle, a kingpin angle between bodies of the host vehicle, or any combination thereof.

For example, the kingpin angle may include a difference between a first heading direction of a first body (e.g., a tractor) and a second heading direction of a second body (e.g., a trailer) among the bodies of the host vehicle at a point on a deflection driving route.

For example, the sensor device 110 may determine (or identify) a distance between each of the bodies of the host vehicle and each of left and right lines expected if the host vehicle continues to drive on a specified driving route. In this case, it may be understood that the left line and right line are replaced with boundaries of the driving road. For example, the determined (or identified) distance may include at least one of a first distance between the left line and the first body of the host vehicle, a second distance between the left line and the second body of the host vehicle, a third distance between the right line and the first body of the host vehicle, a fourth distance between the right line and the second body of host vehicle, or any combination thereof. It may be understood that the distance described above as determined (or identified) by the sensor device 110 is determined (or identified) by the controller 130 by using information obtained by the sensor device 110.

According to an example, the memory 120 may store instructions or data. For example, the memory 120 may store one or more instructions that cause the autonomous driving control apparatus 100 to perform various operations when executed by the controller 130.

For example, the memory 120 and the controller 130 may be implemented as one chipset. The controller 130 may include at least one of a communication processor or a modem.

For example, the memory 120 may store various pieces of information related to the autonomous driving control apparatus 100. For example, the memory 120 may store information about the operation history of the controller 130. For example, the memory 120 may store information related to states and/or operations of components (e.g., at least one of an engine control unit (ECU), the sensor device 110, the controller 130, or any combination thereof) of the host vehicle.

According to an example, the controller 130 may be operatively connected to the sensor device 110 and/or the memory 120. For example, the controller 130 may control the operation of the sensor device 110 and/or the memory 120.

For example, while controlling the host vehicle based route, the controller 130 may on the specified driving determine (or identify) the curvature of a driving road on which the host vehicle is driving.

For example, the specified driving route may include a first driving route (e.g., a normal route) created by the autonomous driving control apparatus 100 without considering an off-tracking situation to control the host vehicle to the destination.

For example, the controller 130 may determine (or identify) the curvature of the driving road in real time by using the sensor device 110.

For example, if the determined (or identified) curvature exceeds reference curvature, the controller 130 may determine (or identify) information about at least one of a driving road, both lines (or both boundaries of the driving road) of the driving road, features of the host vehicle, a kingpin angle between bodies of the host vehicle, or any combination thereof by using the sensor device 110.

For example, the controller 130 may determine (or identify) information about one of the curvature of the driving road, a road surface state, a distance between the center of the driving road and both lines, or a combination thereof. The controller 130 may determine (or identify) the curvature of the driving road by using another component other than the sensor device 110. For example, the controller 130 may determine (or identify) an average curvature value of some sections (e.g., junction sections) of the driving route where the host vehicle is expected to be driving, by using a communication device (not shown) based on precision map data obtained from an external source (e.g., a server).

For example, the controller 130 may determine (or identify) information about features (e.g., at least one of a length, a width, a height, a weight, or any combination thereof) of at least one body included in the host vehicle.

For example, the kingpin angle may include a difference between a first heading direction of a first body and a second heading direction of a second body among bodies at a point on a deflection driving route.

For example, the controller 130 may determine (or identify) a distance between the host vehicle (or each of bodies included in the host vehicle) and each of left and right lines expected if the host vehicle continues to drive on a specified driving route, based on the determined (or identified) information.

For example, the controller 130 may generate a deflection driving route based on at least one of determined (or identified information, a specified driving route, or any combination thereof, For example, the deflection driving route may include a planned driving route that causes the host vehicle to drive along a route that is spaced apart from the center of the driving road by a specified distance in a specific direction (e.g., a left or right direction based on a direction that the host vehicle is facing) as compared to a specified driving route.

For example, the controller 130 may create the deflection driving route by performing a specified algorithm by using optimization state information.

For example, the optimization state information may include at least one a location lateral error, a heading error, a kingpin angle, curvature for each location, a curvature change amount, a deflection distance based on a specified driving route, or any combination thereof of each of bodies determined (or identified) based on at least one of the information determined (or identified) by the controller 130, the determined (or specified) driving route, or any combination thereof.

For example, the optimization state information may include at least one piece of information determined (or identified) by the controller 130 within a predefined maximum value and a predefined minimum value in correspondence to at least one of the location lateral error, the heading error, the kingpin angle, the curvature for each location, the curvature change amount, the deflection distance, or any combination thereof.

For example, the controller 130 may determine (or identify) at least one of a first offset state for the first body (e.g., a tractor), a second offset state for the second body (e.g., a trailer), or any combination thereof among bodies based on at least one of the determined (or identified) information, the specified driving route, or any combination thereof.

For example, the controller 130 may generate a deflection driving route such that the deflection driving route is adjacent to the center of the driving road as close as possible, based on at least one of the first offset state, the second offset state, or any combination thereof. In other words, the controller 130 may minimize the first offset state and/or second offset state such that the deflection driving route is generated to be adjacent to the center of the driving road as close as possible.

For example, the controller 130 may allow the host vehicle to drive on the driving road along the deflection driving route.

For example, if at least one of a first location lateral error of the first body, a second location lateral error of the second body, a first heading error of the second body, or any combination thereof among bodies satisfies a specified condition, the controller 130 may determine (or identify) that the host vehicle is driving along the deflection driving route.

For example, if a partial differential value of an equation corresponding to at least one of the first location lateral error, the second location lateral error, the first heading error, or any combination thereof is a specified value (e.g., 0), the controller 130 may determine (or identify) that the host vehicle is driving along the deflection driving route.

The components of the autonomous driving control apparatus 100 shown in FIG. 1 are examples, and examples of the present disclosure are not limited thereto. For example, the autonomous driving control apparatus 100 may further include a display device (not shown) and/or a notification device (not shown).

According to an example, the display device may visually provide a user with a user interface including a driving route (e.g., a deflection driving route) of the host vehicle.

For example, the display device may, in real time, provide the user with the user interface including information about at least one of a deflection driving route, a driving lane, both lines of the driving lane, a distance between the driving lane and the deflection driving route, a distance between each of the bodies of the host vehicle and both lines of the driving lane, or any combination thereof, which is generated by the controller 130.

According to an example, the notification device may include at least one output device. For example, the notification device may include an output device (e.g., a speaker) included in at least part of the interior of the host vehicle.

For example, the notification device may output various types of sounds to the outside.

For example, under control of the controller 130, the notification device may provide the user with a guide message indicating that the planned driving route of the host vehicle is changed from a specified driving route (e.g., a route for following the center of the driving lane) to the deflection driving route.

Figure 2:
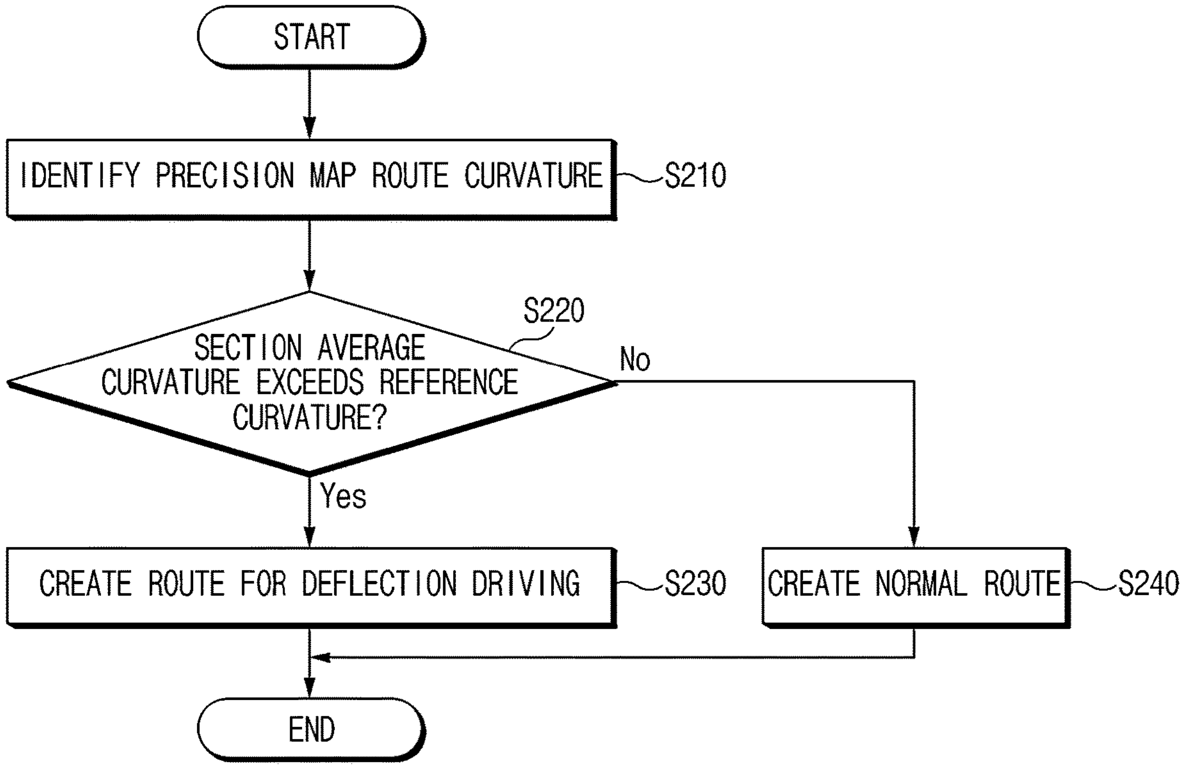
FIG. 2 shows an example of a flowchart of an autonomous driving control method, according to an example of the present disclosure.

FIG. 2 shows an example of a flowchart of an autonomous driving control method, according to an example of the present disclosure.

According to an example, an autonomous driving control apparatus (e.g., the autonomous driving control apparatus of FIG. 1) may perform operations described in FIG. 2. For example, at least some of components (e.g., the sensor device 110, the memory 120, and/or the controller 130 in FIG. 1) included in the autonomous driving control apparatus may be set to perform operations of FIG. 2.

In the following example, operation S210 to operation S240 may be sequentially performed, but are not always performed sequentially. For example, the order of operations may be changed, and at least two operations may be performed in parallel. Moreover, descriptions corresponding to or identical to the above-mentioned descriptions given with reference to FIG. 2 may be briefly described or omitted to avoid redundancy.

According to an example, the autonomous driving control apparatus may identify the curvature of a route based on precision map data (S210).

For example, the autonomous driving control apparatus may identify an average curvature value of a driving route where a host vehicle is expected to drive, based on the precision map data received from an external source (e.g., a server) by using a communication device.

According to an example, the autonomous driving control apparatus may determine whether section average curvature exceeds reference curvature (S220).

For example, the section average curvature may be an average curvature value of some sections (e.g., a junction section) of the driving road on which the host vehicle is driving.

For example, if it is determined that the section average curvature exceeds the reference curvature (e.g., operation S220—Yes), the autonomous driving control apparatus may perform operation S230.

For example, if it is determined that the section average curvature does not exceed the reference curvature (e.g., operation S220—No), the autonomous driving control apparatus may perform operation S240.

According to an example, the autonomous driving control apparatus may create a route for deflection driving (S230).

A method in which an autonomous driving control apparatus creates a deflection driving route will be described in more detail with reference to FIGS. 3 to 8.

According to an example, the autonomous driving control apparatus may create a normal route (S240).

For example, the normal route may be a driving route created to follow the center of the driving road. When controlling the driving of the first host vehicle, the autonomous driving control apparatus may control the host vehicle based on the normal route.

Figure 3:
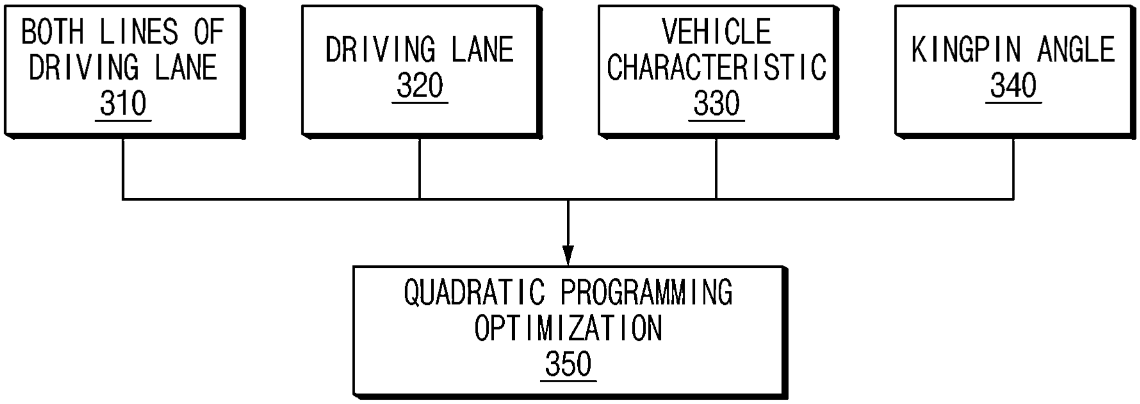
FIG. 3 shows an example of a flowchart of an autonomous driving control method, according to an example of the present disclosure.

FIG. 3 shows an example of a flowchart of an autonomous driving control method, according to an example of the present disclosure.

According to an example, an autonomous driving control apparatus (e.g., the autonomous driving control apparatus 100 in FIG. 1) may identify information according to reference numbers 310 to 340 and may perform a specified optimization algorithm (e.g., quadratic programming optimization 350) based on the identified information to generate a deflection driving route.

For example, the autonomous driving control apparatus may identify the information about both lines of a driving lane 310 (or a driving road).

For example, the autonomous driving control apparatus may identify the information 320 about the driving lane.

For example, the autonomous driving control apparatus may identify the information 330 about a vehicle characteristic.

For example, the autonomous driving control apparatus may identify the information 340 about a kingpin angle.

For example, the autonomous driving control apparatus may identify information about at least one of a distance from the center of the driving lane to a left line and a right line (or a left border and a right border), a distance between each of bodies of the host vehicle and both lines of the driving lane, a location lateral error of each of the bodies included in the host vehicle, a heading error, a kingpin angle, curvature for each location of the host vehicle, a curvature change amount, a deflection distance, or any combination thereof by using at least one of the information about both lines of the driving lane 310, the information about the driving lane 320, the information about the vehicle characteristic 330, or any combination thereof.

For example, the kingpin angle may include a difference between a first heading direction of a first body (e.g., a tractor) and a second heading direction of a second body (e.g., a trailer) among the bodies included in the host vehicle at a point on a driving route.

For example, the autonomous driving control apparatus may create the deflection driving route based on the quadratic programming optimization 350.

For example, the autonomous driving control apparatus may identify a distance between the host vehicle and each of left and right lines expected if the host vehicle continues to drive along the specified driving route, and may generate the deflection driving route based on the identified distance.

For example, the autonomous driving control apparatus may identify optimization state information including at least one of a location lateral error, a heading error, curvature for each location of the host vehicle, a curvature change amount, a deflection distance, or any combination thereof of each of bodies based on at least some of pieces of information according to reference numbers 310 to 340 and a specified driving route (e.g., a driving route that allows the host vehicle to follow the center of a driving lane).

For example, the autonomous driving control apparatus may identify the optimization state information further based on predefined maximum and minimum values (or an allowable range) in correspondence to at least one of the location lateral error, the heading error, the kingpin angle, the curvature for each location, the curvature change amount, the deflection distance, or any combination thereof.

For example, the autonomous driving control apparatus may create the deflection driving route by using at least part of the optimization state information.

For example, the autonomous driving control apparatus may identify at least one of a first offset state for the first body and a second offset state for the second body, or any combination thereof among the bodies based on at least one of identified information, a specified driving route, or any combination thereof, and may create the deflection driving route so as to be adjacent to the center of the driving road based on at least one of the first offset state, the second offset state, or any combination thereof.

Figure 4:
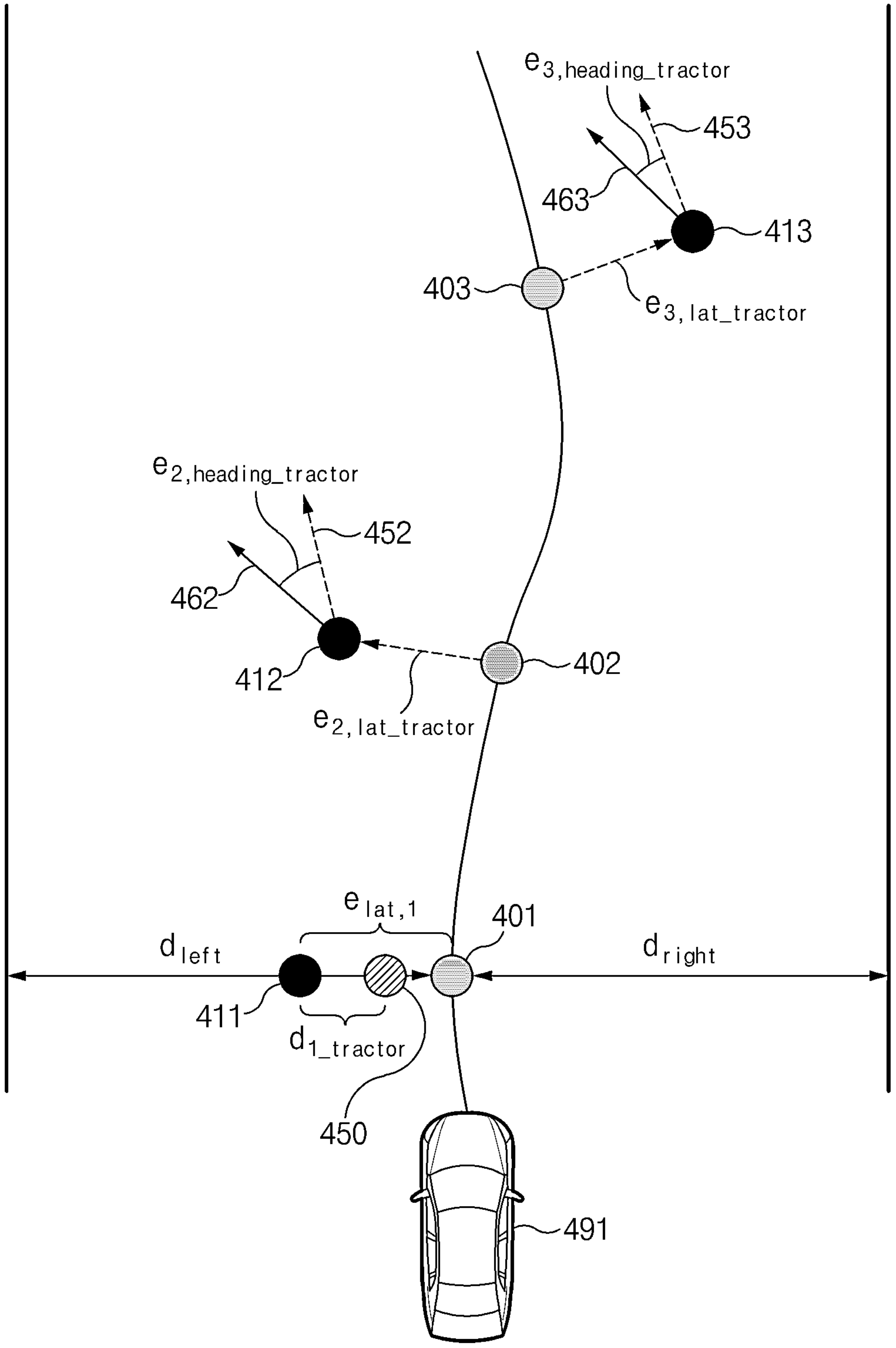
FIG. 4 shows an example of an operation of an autonomous driving control apparatus, according to an example of the present disclosure.
Figure 5:
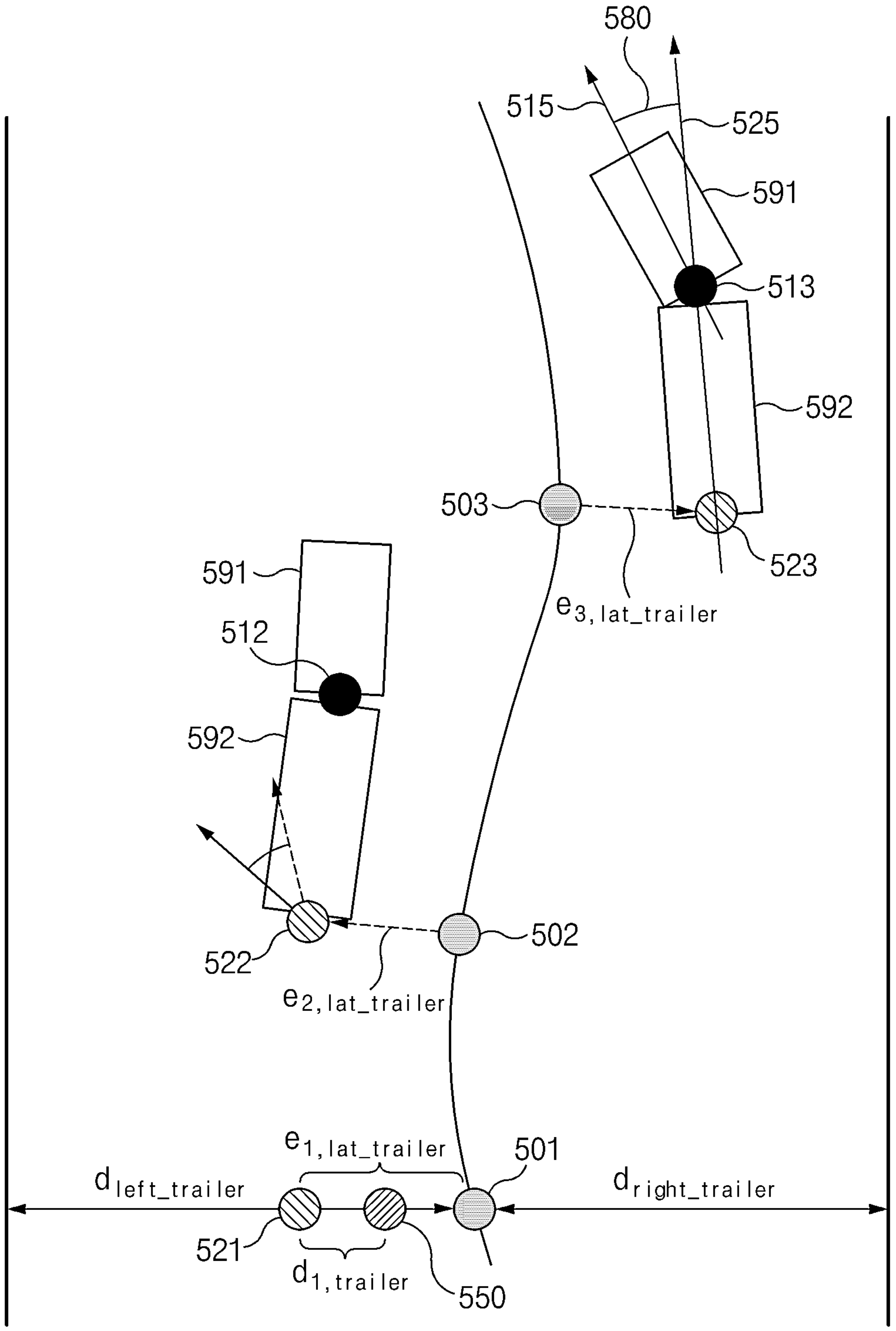
FIG. 5 shows an example of an operation of an autonomous driving control apparatus, according to an example of the present disclosure.

In the descriptions of FIGS. 4 and 5 below, a method in which an autonomous driving control apparatus (e.g., the autonomous driving control apparatus 100 in FIG. 1) identifies optimization state information based on an optimization algorithm (e.g., quadratic programming) and generates the deflection driving route based on the optimization state information will be described later.

For example, the optimization algorithm performed by the autonomous driving control apparatus may be performed by calculating a domain based on a cost function (e.g., cost) according to Equation 1 below.

$$\left(\frac{1}{2}\right)z^T Hz + q^T z \qquad \text{[Equation 1]}$$

For example, 'z' may be 'n' state values (e.g., an n-dimensional vector) to be obtained through the optimization algorithm. For example, $z^T$ may be a transpose vector of 'z'. For example, 'H' may be various types of matrices (e.g., Hessian Matrix). For example, 'q' may be an n-dimensional real matrix, and $q^T$ may be a transpose matrix of 'q'. The autonomous driving control apparatus may identify 'z' in a direction in which a value of the cost function according to Equation 1 is minimized.

For example, 'z' may include optimization state information.

For example, 'z' may include route point state information $X_i$. For example, the route point state information $X_i$ may include at least one of a location lateral error, a heading error, a kingpin angle, curvature, or any combination thereof at each specified point of each of bodies (e.g., a tractor and/or a trailer) included in the host vehicle. Each of the location lateral error and the heading error may be an error value (or a change amount) calculated by comparing the deflection driving route with a specified driving route (e.g., a driving route configured to follow the center of the driving road). An example of the route point state information $X_i$ at specific point (i) may be as follows.

$$X_i=[e_{lat\_tractor},\ e_{heading\_tractor},\ \beta,\ K,\ e_{lat\_trailer},\ e_{heading\_trailer}]^T$$

For example, 'z' may include vehicle model input state information 'u'. For example, the vehicle model input state information 'u' may include a change amount of curvature. For example, the autonomous driving control apparatus may change route point state information $X_1$ at a first point to route point state information $X_2$ at a second point, by using the vehicle model input state information 'u' as an input value.

For example, 'z' may include vehicle center reference deflection value state information d_tractor and/or d'_trailer. For example, the first body center reference deflection value state information d_tractor may include information that enables a distance from the center of the first body to a left line (or a left border) of the driving road and a distance to a right line (or a right border) thereof to be substantially the same (or maximized) as each other. For example, the second body center reference deflection value state information d'_trailer may include information that enables a distance from the center of the second body to a left line (or a left border) of the driving road and a distance to a right line (or a right border) thereof to be substantially the same (or maximized) as each other.

For example, the autonomous driving control apparatus may set an optimization algorithm to find a domain that satisfies a constraint function (e.g., constraint) according to Equation 2 below.

$$b \le Az \le c \qquad \text{[Equation 2]}$$

For example, 'b' and 'c' may be m-dimensional real vectors. For example, 'A' may be a m×n dimensional real matrix. In other words, the autonomous driving control apparatus may identify optimization state information and a deflection driving route by calculating the domain on the premise that the result of the multiplication of matrix 'A' and vector 'z' has a value between vector 'b' and vector 'c'.

FIG. 4 shows an example of an operation of an autonomous driving control apparatus, according to an example of the present disclosure.

According to an example, FIG. 4 may be a diagram illustrated based on a first body (e.g., a tractor) among bodies of a host vehicle 491.

According to an example, if curvature of a driving road exceeds reference curvature, an autonomous driving control apparatus (e.g., the autonomous driving control apparatus 100 in FIG. 1) may identify information about at least one of a driving road, both lines of the driving road, features of the host vehicle, a kingpin angle between bodies of the host vehicle, or any combination thereof, and may identify optimization state information based on at least one of identified information, a specified driving route (e.g., a curved driving route shown in FIG. 4), or any combination thereof.

For example, the optimization state information may include various pieces of information identified based on a point (e.g., a first point 401, a second point 402, and a third point 403) of a specified driving route.

For example, the autonomous driving control apparatus may identify a first optimization point 411, and may identify a first location lateral error $e_{lat,1}$ of the first body from the first point 401 to the first optimization point 411.

For example, the autonomous driving control apparatus may identify a second optimization point 412, and may identify a second location lateral error $e_{2,\ lat\_tractor}$ from the second point 402 to the second optimization point 412. The autonomous driving control apparatus may identify a second heading error $e_{2,\ heading\_tractor}$ corresponding to a difference between second optimization heading 462 of the first body based on the second optimization point 412 and second reference heading 452 of the first body based on the second point 402.

For example, the autonomous driving control apparatus may identify a third optimization point 413 and may identify a third location lateral error $e_{3,\ lat\_tractor}$ from the third point 403 to the third optimization point 413. The autonomous driving control apparatus may identify a third heading error $e_{3,\ heading\_tractor}$ corresponding to a difference between third optimization heading 463 of the first body based on the third optimization point 413 and third reference heading 453 of the first body based on the third point 403.

For example, the autonomous driving control apparatus may identify a first offset point 450 at which a distance from the first body to a left line (or a left boundary) is the same as a distance from the first body to a right line (or a right boundary). For example, the first offset point 450 may be a point spaced from the first optimization point 411 in a direction facing the first point 401 by a first offset distance (or a first offset state) $d_{1\_tractor}$. For example, the first offset distance $d_{1\_tractor}$ may be calculated by using Equation below.

$$d_1 = e_{y,1} - \frac{d_{left} + d_{right}}{2} \qquad \text{[Equation 3]}$$

For example, $d_1$ may be a distance spaced from the first optimization point 411 that enables a distance from the center of the first body to a left line (or a left border) of the driving road and a distance to a right line (or a right border) thereof to be substantially the same (or maximized) as each other. In other words, the autonomous driving control apparatus may generate a deflection driving route based on the first offset point spaced from the first optimization point 411 by $d_1$. For example, $e_{y,1}$ may be a lateral location value of the first body identified based on the first point 401. For example, $d_{left}$ and $d_{right}$ may be distances spaced from the first point 401 to the left line and the right line, respectively.

FIG. 5 shows an example of an operation of an autonomous driving control apparatus, according to an example of the present disclosure.

According to an example, FIG. 5 may be a diagram illustrated based on a second body 592 (e.g., a tractor) among bodies of the host vehicle 491. Referring to FIG. 5, the host vehicle may include a first body 591 and the second body 592 that is physically connected to the first body 591.

According to an example, if curvature of a driving road exceeds reference curvature, an autonomous driving control apparatus (e.g., the autonomous driving control apparatus 100 in FIG. 1) may identify information about at least one of a driving road, both lines of the driving road, features of the host vehicle, a kingpin angle between bodies of the host vehicle, or any combination thereof, and may identify optimization state information based on at least one of identified information, a specified driving route (e.g., a curved driving route shown in FIG. 5), or any combination thereof.

For example, the optimization state information may include various pieces of information identified based on a point (e.g., a first point 501, a second point 502, and a third point 503) of a specified driving route.

For example, the autonomous driving control apparatus may identify a first virtual optimization point 521, which is based on one area of the second body 592, and may identify a first location lateral error $e_{lat,1}$ of the second body 592 from the first point 501 to the first virtual optimization point 521.

For example, the autonomous driving control apparatus may identify a second optimization point 522, which is based on a second area 512 of the second body 592, and may identify a second location lateral error $e_{2,\ lat\_trailer}$ from the second point 502 to the second optimization point 522. The second body 592 may be physically connected to the second area 512 of the first body 591. The autonomous driving control apparatus may identify a second heading error corresponding to a difference between second optimization heading of the second body 592 based on the second optimization point 522 and second reference heading of the second body 592 based on the second point 502.

For example, the autonomous driving control apparatus may identify a third virtual optimization point 523, which is based on a third area 513 of the second body 592, and may identify a third location lateral error $e_{3,\ lat\_trailer}$ from the third point 503 to the third virtual optimization point 523. The second body 592 may be physically connected to the third area 513 of the first body 591. The autonomous driving control apparatus may identify a third heading error 580 corresponding to a difference between third optimization heading 525 of the second body 592 based on the third virtual optimization point 523 and third reference heading 515 of the second body 592 based on the third point 503.

For example, the autonomous driving control apparatus may identify a first offset point 550 at which a distance from the second body 592 to a left line (or a left boundary) is the same as a distance from the second body 592 to a right line (or a right boundary). For example, the first offset point 550 may be a point spaced from the first virtual optimization point 521 in a direction facing the first point 501 by a first offset distance (or a first offset state) $d_{1\_trailer}$. For example, the first offset distance $d_{1\_trailer}$ may be calculated by using Equation 3 below.

For example, in FIG. 5, $d_{left\_trailer}$ and $d_{right\_trailer}$ may be distances spaced from the first point 501 to the left line and the right line, respectively.

According to an example, the autonomous driving control apparatus may identify a vector corresponding to a linearized tractor vehicle model based on parameters corresponding to start and end points according to Equation 4 and Equation 5 below.

$$p_0 = [e_{y-TT,0}, e_{\theta-TT,0}, \beta_0, e_{y-tr,0}, e_{\theta-tr,0}, k_0]^T \quad \text{[Equation 4]}$$

$$p_N = [e_{y-TT,N}, e_{\theta-TT,N}, \beta_N, e_{y-tr,N}, e_{\theta-tr,N}, k_N]^T \quad \text{[Equation 5]}$$

For example, $p_0$ and $p_N$ may be vectors corresponding to a start point and an end point, respectively. For example, $e_{y\_TT,0}$ and $e_{y\_TT,N}$ may be location lateral errors of the first body (e.g., a tractor) corresponding to the start point and the end point, respectively. For example, $e_{\theta\_TT,0}$ and $e_{\theta\_TT,N}$ may be heading errors of the first body corresponding to the start point and the end point, respectively. For example, $\beta_0$ and $\beta_N$ may be kingpin angles corresponding to the start point and the end point, respectively. For example, $e_{y\_tr,0}$ and $e_{y\_tr,N}$ may be location lateral errors of the second body (e.g., a trailer) corresponding to the start point and the end point, respectively. For example, $e_{\theta\_tr,0}$ and $e_{\theta\_tr,N}$ may be heading errors of the second body corresponding to the start point and the end point, respectively.

According to an example, the autonomous driving control apparatus may identify a vector corresponding to a linearized tractor vehicle model based on Equation 6 below.

$$\begin{bmatrix} e_{y-TT,i+1} \\ e_{\theta-TT,i+1} \\ \beta_{i+1} \\ k_{i+1} \end{bmatrix} = \begin{bmatrix} 1 & ds & 0 & 0 \\ -ds\cdot k_{p,i}^2 & 1 & 0 & ds \\ -ds\cdot k_{p,i}^2\cdot\left(1+\frac{M_1}{L_2}\right) & 0 & \left(1-\frac{d_s}{L_2}\right) & ds\cdot\left(1+\frac{M_1}{L_2}\right) \\ 0 & 0 & 0 & 1 \end{bmatrix} \cdot \begin{bmatrix} e_{y-TT,i} \\ e_{\theta-TT,i} \\ \beta_i \\ k_i \end{bmatrix} + \begin{bmatrix} 0 \\ 0 \\ 0 \\ 1 \end{bmatrix} \cdot u + \begin{bmatrix} 0 \\ -ds\cdot k_{p,i}^2 \\ 0 \\ 0 \end{bmatrix} \quad \text{[Equation 6]}$$

According to an example, the autonomous driving control apparatus may identify a function corresponding to a trailer state based on Equation 7 below.

$$\hat{e}_{y,tr} = \bar{e}_{y,tr} + \frac{\delta e_{y,tr}}{\delta e_{y,TT}}(e_{y,TT} - \bar{e}_{y,TT}) + \frac{\delta e_{y,tr}}{\delta e_{\theta,TT}}(e_{\theta,TT} - \bar{e}_{\theta,TT}) + \frac{\delta e_{y,tr}}{\delta \beta}(\beta - \bar{\beta}) \quad \text{[Equation 7]}$$

For example, the autonomous driving control apparatus may identify that the first body and second body are perfectly following a driving route when $\bar{e}_{y,tr}$, $\bar{e}_{y,TT}$, and $\bar{e}_{\theta,TT}$ are specified values (e.g., 0).

According to an example, the autonomous driving control apparatus may identify a range of a lateral distance offset value for generating a deflection driving route based on Equation 8 below.

$$e^{min}_{lat\,tractor} \le e_{lat\,tractor,j} \le e^{max}_{lat\,tractor} \quad \text{[Equation 8]}$$
$$e^{min}_{lat\,trailer} \le e_{lat\,tractor,j} \le e^{max}_{lat\,trailer}$$

According to an example, the autonomous driving control apparatus may identify a lateral distance offset value for generating a deflection driving route based on Equation 9 below.

$$d_{j,tractor} = e_{lat\,tractor,j} - \frac{1}{2}\left(e^{min}_{lat\,tractor} + e^{max}_{lat\,tractor}\right) \quad \text{[Equation 9]}$$
$$d_{j,trailer} = e_{lat\,trailer,j} - \frac{1}{2}\left(e^{min}_{lat\,trailer} + e^{max}_{lat\,trailer}\right)$$

According to an example, the autonomous driving control apparatus may identify a range of a curvature value for generating a deflection driving route based on Equation 10 below.

$$-k_{max} \le k_j \le k_{max} \quad \text{[Equation 10]}$$

According to an example, the autonomous driving control apparatus may identify a cost function (cost function J) for generating a deflection driving route based on Equation 11 below.

$$\text{Cost function } J = w_{d\,tractor}\sum_{i=1}^{N} d^2_{i\,tractor} + w_{d\,trailer}\sum_{i=1}^{N} d^2_{i\,trailer} \quad \text{[Equation 11]}$$

For example, in a process of creating a correction route for deflection driving from a driving route thus previously generated, the autonomous driving control apparatus may allow the first body and the second body to drive at the center of the driving road as much as possible even if the first body and the second body are driving in a deflection method, by minimizing an offset state (or a distance) from the center of the driving road based on the cost function according to Equation 11 (or by maximizing a distance to a boundary of the driving road).

Figure 6:
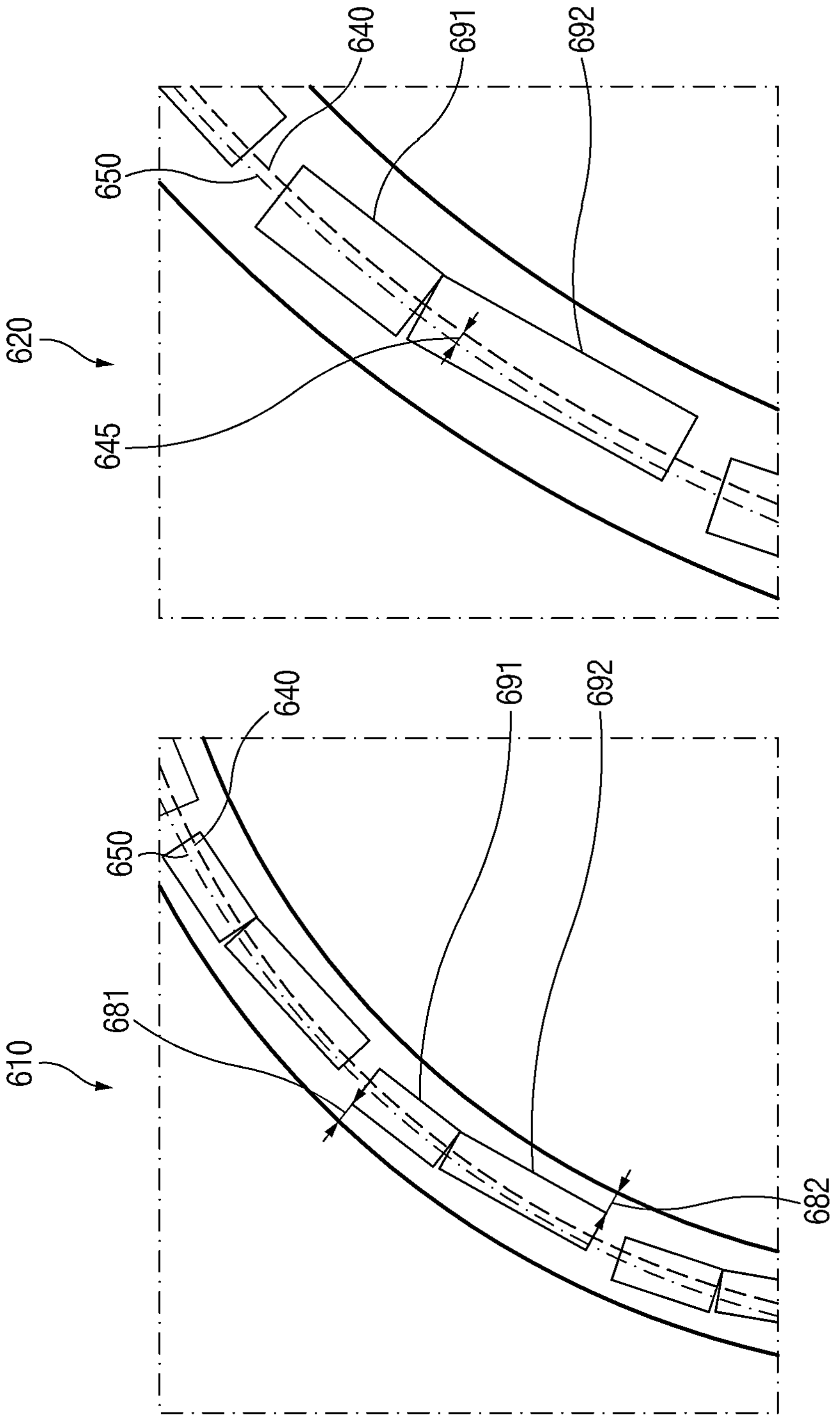
FIG. 6 shows an example of an operation of an autonomous driving control apparatus, according to an example of the present disclosure.

FIG. 6 shows an example of an operation of an autonomous driving control apparatus, according to an example of the present disclosure.

Referring to reference number 610, according to an example, an autonomous driving control apparatus (e.g., the autonomous driving control apparatus 100 in FIG. 1) may generate a deflection driving route 650 to control deflection driving of a host vehicle including a first body 691 and a second body 692. For example, when compared to a specified driving route 640 thus previously generated, the deflection driving route 650 may include at least part of a route that is deflected from the center of the driving road in a specified direction. Accordingly, the first body 691 may drive while securing a first clearance distance 681 to a left line (or a left boundary) based on a direction that the host vehicle faces. The second body 692 may drive while securing a second clearance distance 682 to a right line (or a right boundary) based on the direction that the host vehicle faces.

Referring to reference number 620, according to an example, the autonomous driving control apparatus may generate the deflection driving route 650 that is deflected from the center of the driving road by a specific distance 645 in a specified direction based on the specified driving route 640 thus previously generated.

Figure 7:
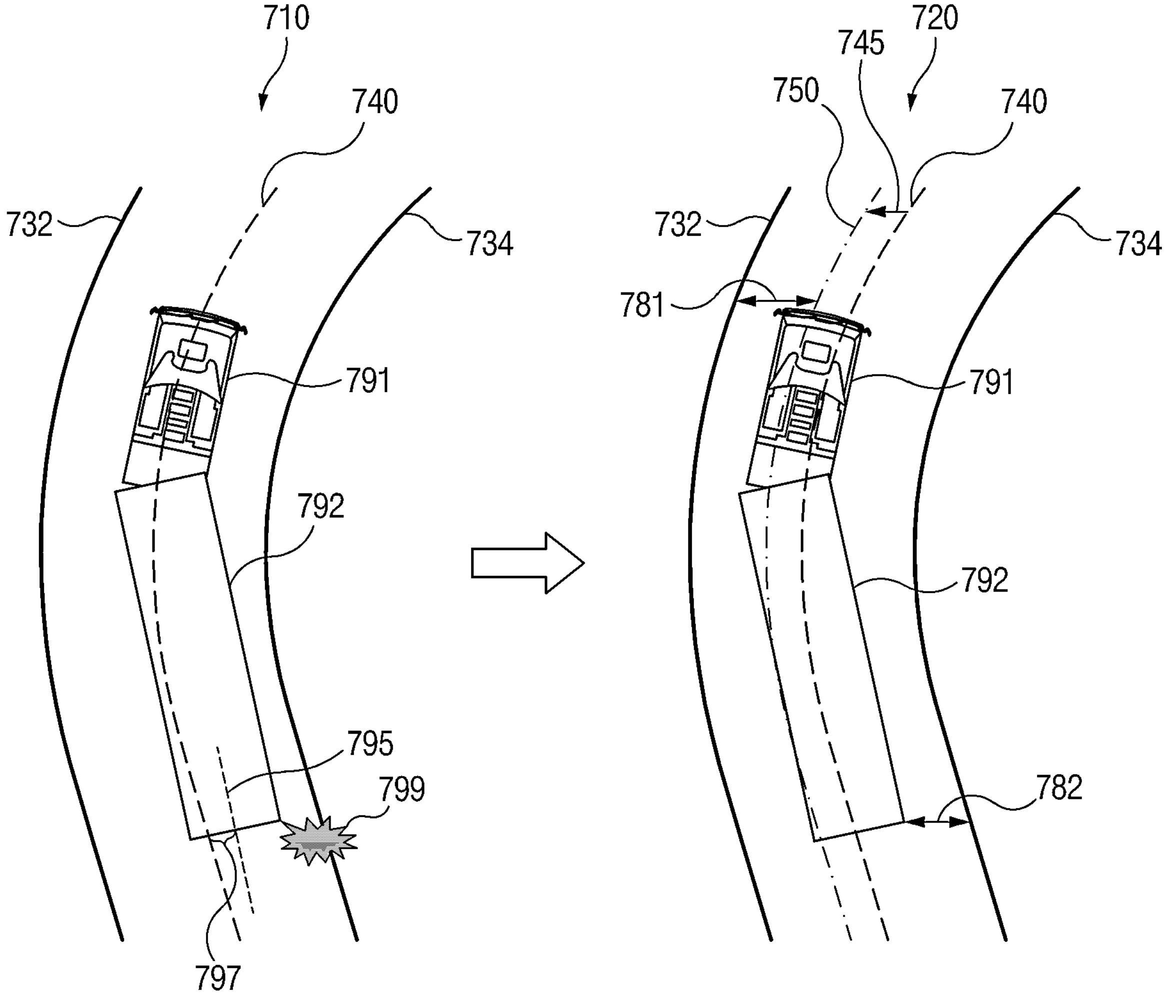
FIG. 7 shows an example of an operation of an autonomous driving control apparatus, according to an example of the present disclosure.

FIG. 7 shows an example of an operation of an autonomous driving control apparatus, according to an example of the present disclosure.

Referring to reference number 710, according to an example, an autonomous driving control apparatus (e.g., the autonomous driving control apparatus 100 in FIG. 1) may control a host vehicle based on a specified driving route 740 that has already been created (or set). The specified driving route 740 may include a route on which the host vehicle is configured to follow the center of a driving road. In this case, as a second body 792 is spaced from the specified driving route 740 by a specific distance 797 and drives while facing a specified reference direction 795, there may be a risk of collision 799 with a specific line (or a specific boundary) (e.g., a right line 734) of the driving road.

Referring to reference number 720, according to an example, the autonomous driving control apparatus may generate a deflection driving route 750 that is deflected from the center of the driving road by a specific distance in a specified direction 745 based on the specified driving route 740 thus previously generated. In this case, a first body 791 may drive while securing a clearance distance as long as a first distance 781 from a left line 732 of the driving road, and the second body 792 drives while securing a clearance distance as long as a second distance 782 from a right line 734 of the driving road. Accordingly, diving safety may be improved.

Figure 8:
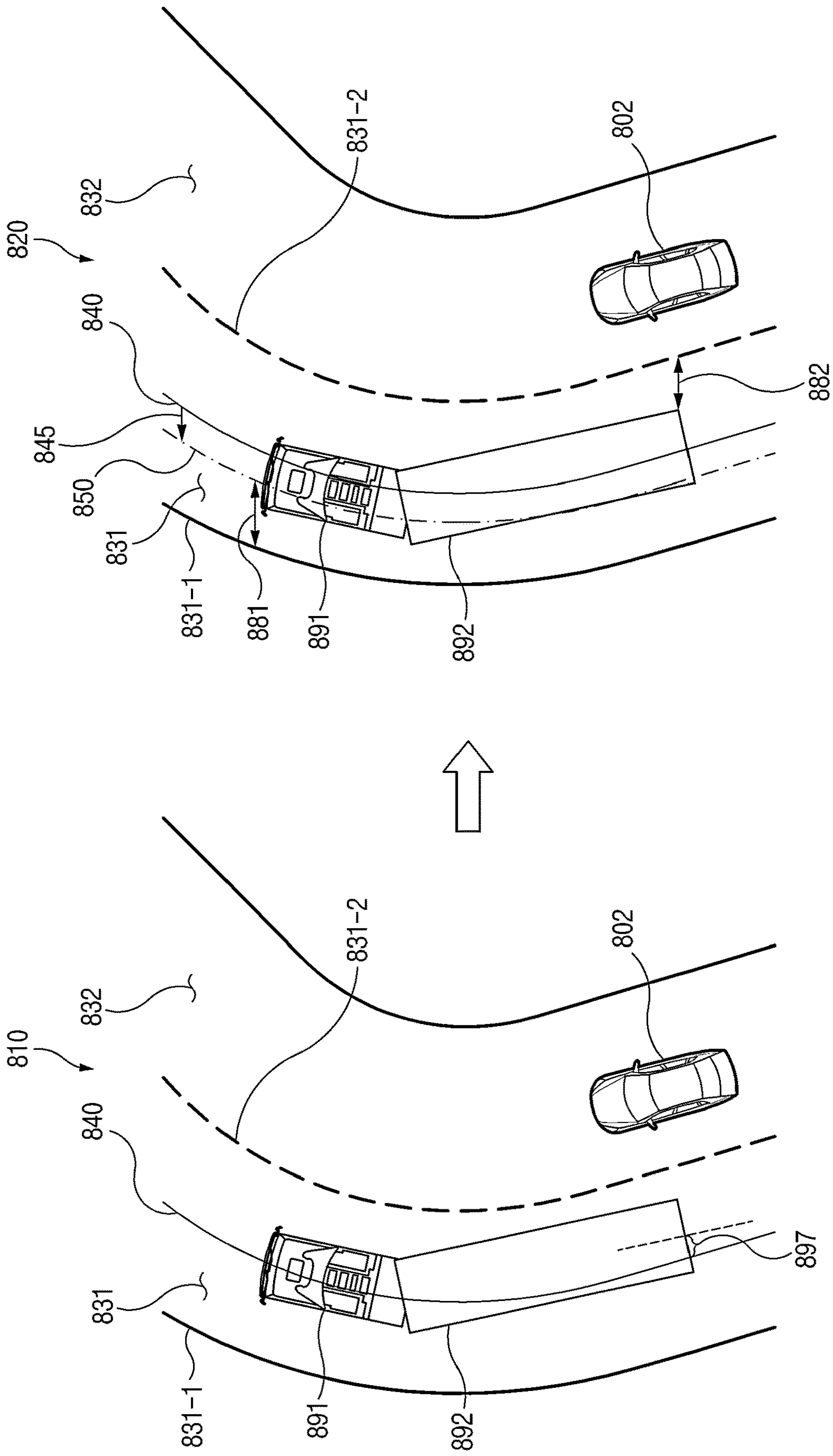
FIG. 8 shows an example of an operation of an autonomous driving control apparatus, according to an example of the present disclosure.

FIG. 8 shows an example of an operation of an autonomous driving control apparatus, according to an example of the present disclosure.

Referring to reference number 810, according to an example, an autonomous driving control apparatus (e.g., the autonomous driving control apparatus 100 in FIG. 1) may control a host vehicle based on a specified driving route 840 that has already been created (or set). The specified driving route 840 may include a route on which the host vehicle is configured to follow the center of a driving road. In this case, as a second body 892 is driving while being spaced from a specified driving route 840 by a specific distance 897, the second body 892 is adjacent to a specific line (or a specific boundary) (e.g., a right line 831-2) of the driving road 831, Accordingly, risks such as the increased possibility of collision may occur because the second body 892 is adjacent to another vehicle 802 driving on a right road 832 positioned on the right side of the driving road 831.

Referring to reference number 820, according to an example, the autonomous driving control apparatus may generate a deflection driving route 850 that is deflected from the center of the driving road 831 by a specific distance in a specified direction 845 based on the specified driving route 840 thus previously generated. In this case, a first body 891 may drive while securing a clearance distance as long as a first distance 881 from a left line 831-1 of the driving road 831, and the second body 892 drives while securing a clearance distance as long as a second distance 882 from a right line 831-2 of the driving road 831. Accordingly, diving safety may be improved because the possibility of collision is reduced by being relatively spaced from the other vehicle 802 driving on a right road 832 positioned on the right side of the driving road 831.

Figure 9:
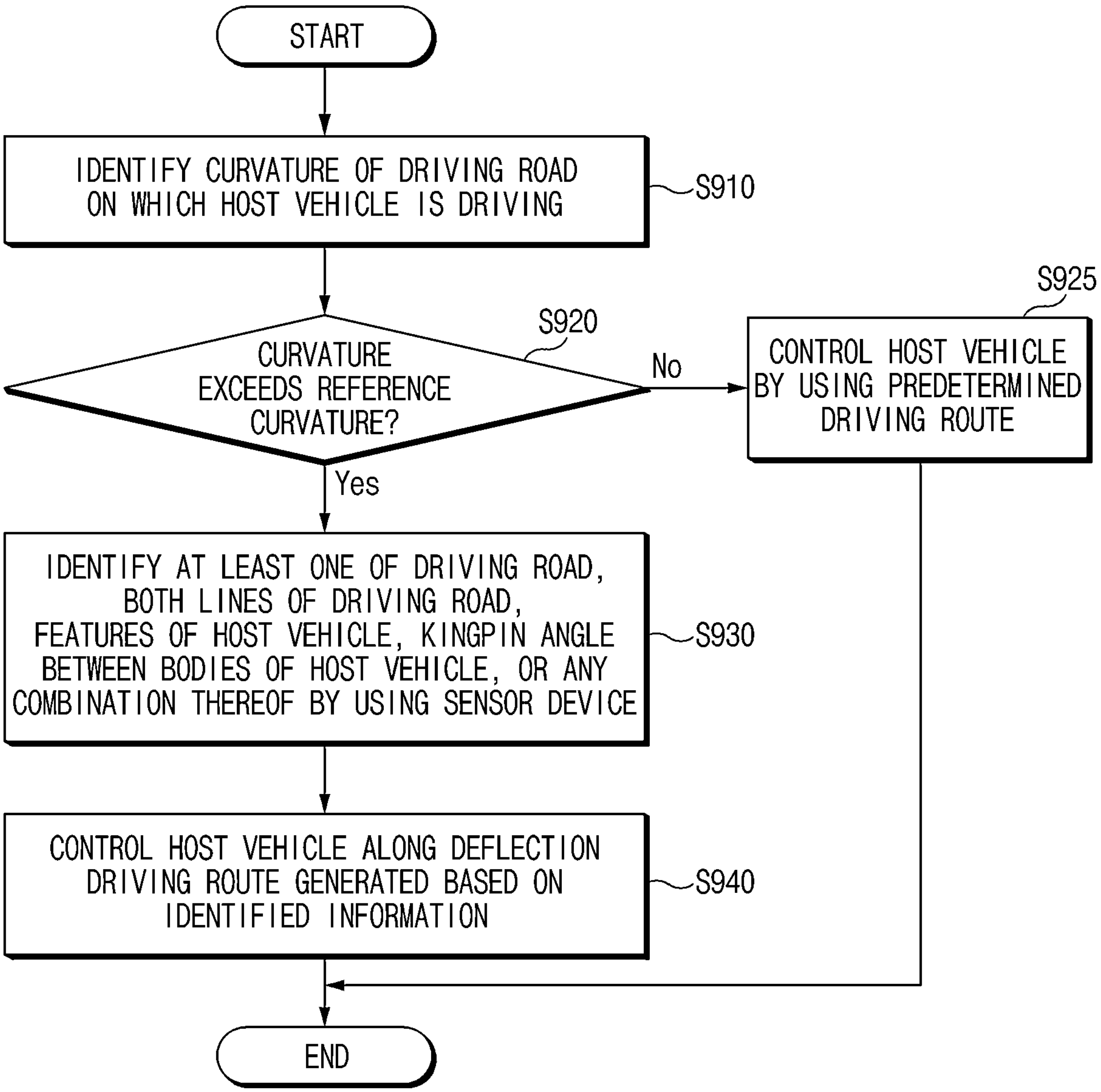
FIG. 9 shows an example of a flowchart of an autonomous driving control method, according to an example of the present disclosure.

FIG. 9 shows an example of a flowchart of an autonomous driving control method, according to an example of the present disclosure.

According to an example, an autonomous driving control apparatus (e.g., the autonomous driving control apparatus of FIG. 1) may perform operations described in FIG. 9. For example, at least some of components (e.g., the sensor device 110, the memory 120, and/or the controller 130 in FIG. 1) included in the autonomous driving control apparatus may be set to perform operations of FIG. 9.

In the following example, S910 to S940 may be sequentially performed, but are not always performed sequentially. For example, the order of operations may be changed, and at least two operations may be performed in parallel. Moreover, descriptions corresponding to or identical to the above-mentioned descriptions given with reference to FIG. 9 may be briefly described or omitted to avoid redundancy.

According to an example, the autonomous driving control apparatus may identify the curvature of a driving road on which a host vehicle is driving (S910).

For example, the autonomous driving control apparatus may identify an average curvature value of a driving route where the host vehicle is expected to drive, based on the precision map data received from an external source (e.g., a server) by using a communication device.

For example, the autonomous driving control apparatus may identify the curvature of the driving road, on which the host vehicle is driving, by using a sensor device.

According to an example, the autonomous driving control apparatus may determine whether the identified curvature exceeds reference curvature (S920).

For example, the identified curvature may be an average curvature value of some sections (e.g., a junction section) of the driving road on which the host vehicle is driving.

For example, the identified curvature may be the average curvature value of some sections of an expected driving route, on which the host vehicle is expected to drive.

For example, if it is determined that the identified curvature exceeds the reference curvature (e.g., operation S920—Yes), the autonomous driving control apparatus may perform operation S930.

For example, if it is determined that the identified curvature does not exceed the reference curvature (e.g., operation S920—No), the autonomous driving control apparatus may perform operation S925.

According to an example, the autonomous driving control apparatus may control the host vehicle by using a predetermined driving route (S925).

For example, the predetermined driving route (e.g., a specified driving route) may include a driving route generated as an autonomous driving control apparatus allows the host vehicle to follow the center of a driving lane (or a driving road).

According to an example, the autonomous driving control apparatus may identify at least one of a driving road, both lines of the driving road, features of the host vehicle, a kingpin angle between bodies of the host vehicle, or any combination thereof by using a sensor device (S930).

For example, the autonomous driving control apparatus may identify a distance between the host vehicle and each of left and right lines expected if the host vehicle continues to drive along the specified driving route, and may generate the deflection driving route further based on the identified distance.

For example, the autonomous driving control apparatus may identify optimization state information including at least one of a location lateral error, a heading error, curvature for each location of the host vehicle, a curvature change amount, a deflection distance, or any combination thereof for each of bodies based on at least some of pieces of information according to reference numbers 310 to 340 and a specified driving route (e.g., a driving route that allows the host vehicle to follow the center of a driving lane).

For example, the autonomous driving control apparatus may identify the optimization state information further based on predefined maximum and minimum values (or an allowable range) in correspondence to at least one of the location lateral error, the heading error, the kingpin angle, the curvature for each location, the curvature change amount, the deflection distance, or any combination thereof.

For example, the autonomous driving control apparatus may create the deflection driving route by using at least part of the optimization state information.

For example, the autonomous driving control apparatus may identify at least one of a first offset state for the first body and a second offset state for the second body, or any combination thereof among the bodies based on at least one of identified information, a specified driving route, or any combination thereof, and may create the deflection driving route so as to be adjacent to the center of the driving road based on at least one of the first offset state, the second offset state, or any combination thereof.

According to an example, the autonomous driving control apparatus may control the driving of the host vehicle along the deflection driving route generated based on the identified information (S940).

For example, if at least one of a first location lateral error of the first body, a second location lateral error of the second body, a first heading error of the second body, or any combination thereof among bodies satisfies a specified condition, the autonomous driving control apparatus may identify that the host vehicle is driving along the deflection driving route. For example, the specified condition may include the case that a partial differential value of an equation corresponding to at least one of a first location lateral error, a second location lateral error, a first heading error, or any combination thereof is a specified value (e.g., 0).

Figure 10:
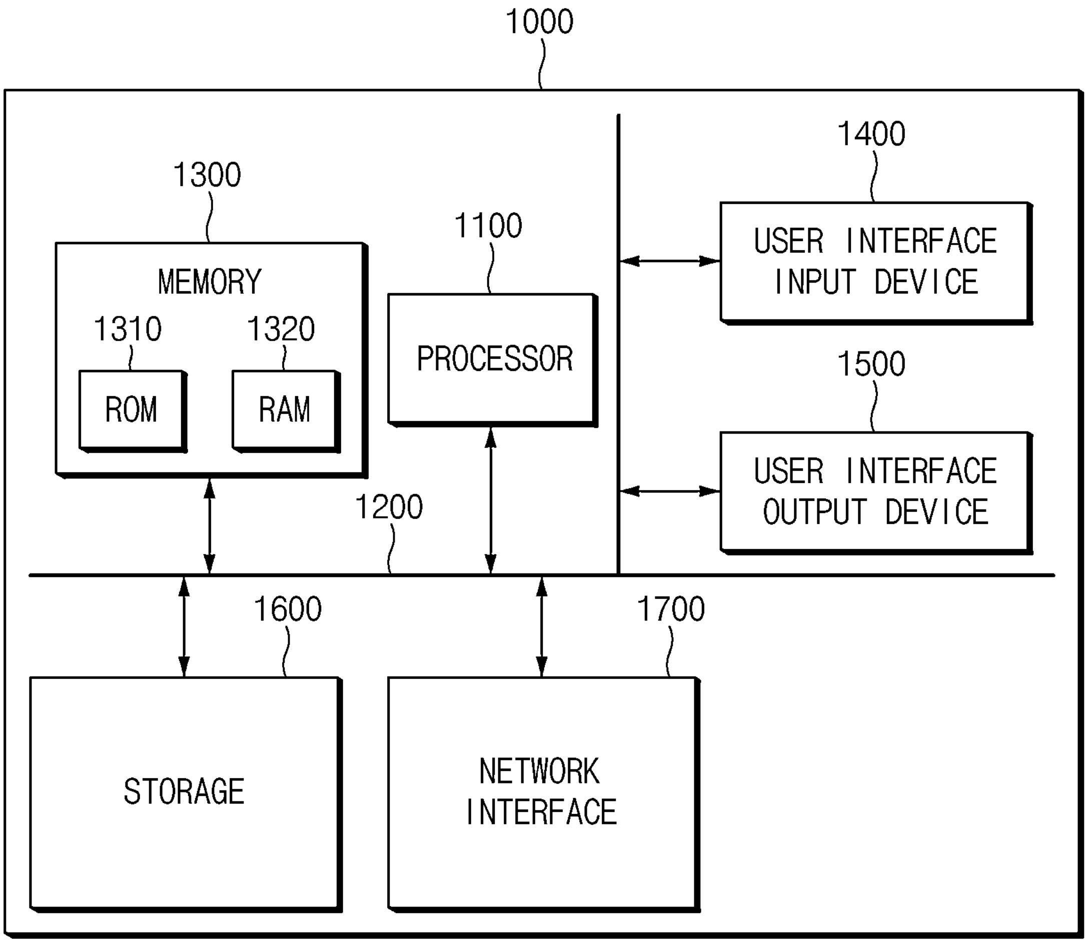
FIG. 10 shows an example of a computing system related to an autonomous driving control method, according to an example of the present disclosure.

FIG. 10 shows an example of a computing system related to an autonomous driving control method, according to an example of the present disclosure.

Referring to FIG. 10, a computing system 1000 related to an autonomous driving control method may include at least one processor 1100, a memory 1300, a user interface input interface output device 1500, a storage device 1400, a user 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Accordingly, the operations of the method or algorithm described in connection with the examples disclosed in the specification may be directly implemented with a hardware module, a software module, or a combination of the hardware module and the software module, which is executed by the processor 1100. The software module may reside on a storage medium (i.e., the memory 1300 and/or the storage

1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM).

The exemplary storage medium may be coupled to the processor 1100. The processor 1100 may read out information from the storage medium and may write information in the storage medium. Alternatively or additionally, the storage medium may be integrated with the processor 1100. The processor and storage medium may be implemented with an application specific integrated circuit (ASIC). The ASIC may be provided in a user terminal. Alternatively or additionally, the processor and storage medium may be implemented with separate components in the user terminal.

The present disclosure has been made to solve the above-mentioned problems occurring in the prior art while advantages achieved by the prior art are maintained intact.

An example of the present disclosure provides a driving route creation function using a specified algorithm to prevent an off-tracking phenomenon in advance if a driving route is created for autonomous driving control of a host vehicle corresponding to a specific type (e.g., the type of a vehicle including a tractor and a trailer).

An example of the present disclosure provides a function to create a deflection driving route, which is deflected from the center of a lane, by using at least one of a characteristic (e.g., an overall length or an overall width) of each body included in the host vehicle, a kingpin angle (e.g., a difference in an angle viewed from bodies), a feature of a driving road, or any combination thereof if a driving route for the host vehicle is created in a section where the curvature is relatively high.

An example of the present disclosure provides a function to determine whether the host vehicle is driving along a deflection driving route, based on whether at least one of a location lateral error, a heading error, or any combination thereof for each of bodies included in the host vehicle satisfies a specified condition.

An example of the present disclosure provides an autonomous driving control apparatus configured to identify optimization state information within a predefined (or set) range (or maximum and minimum values) in correspondence to at least one of the location lateral error, the heading error, the kingpin angle, the curvature for each location of the host vehicle, the curvature change amount, the deflection distance, or any combination thereof if the optimization state information used to create a deflection driving route is identified.

The technical problems to be solved by the present disclosure are not limited to the aforementioned problems, and any other technical problems not mentioned herein will be clearly understood from the following description by those skilled in the art to which the present disclosure pertains.

According to an example of the present disclosure, an autonomous driving control apparatus includes a sensor device, a memory that stores instructions, and a controller operatively connected to the sensor device and the memory. For example, the instructions, if executed by the controller, cause the autonomous driving control apparatus to determine curvature of a driving road on which a host vehicle is driving while controlling the host vehicle based on a specified driving route, to determine information about at least one of the driving road, both lines of the driving road, a feature of the host vehicle, a kingpin angle between bodies of the host vehicle, or a combination of the driving road, the both lines of the driving road, the feature of the host vehicle, and the kingpin angle between the bodies of the host vehicle by using the sensor device if the curvature exceeds reference curvature, to generate a deflection driving route based on at least one of the determined information, the specified driving route, or a combination of the determined information and the specified driving route, and to control the host vehicle to drive on the driving road along the deflection driving route.

According to an example, the information about the both lines may include information about a left line and a right line based on a driving direction of the host vehicle. For example, the instructions, when executed by the controller, may cause the autonomous driving control apparatus to determine a distance between the host vehicle and each of the left line and the right line, which are expected if the host vehicle continues to drive on the specified driving route, based on the determined information, and to generate the deflection driving route based on the distance.

According to an example, the distance may include at least one of a first distance between the left line and a first body of the host vehicle, a second distance between the left line and a second body of the host vehicle, a third distance between the right line and the first body of the host vehicle, a fourth distance between the right line and the second body of the host vehicle, or a combination of the first distance, the second distance, the third distance, and the fourth distance.

According to an example, the instructions, when executed by the controller, may cause the autonomous driving control apparatus to determine optimization state information including at least one a location lateral error, a heading error, a kingpin angle, curvature for each location, a curvature change amount, a deflection distance based on the specified driving route, or a combination of the location lateral error, the heading error, the kingpin angle, the curvature for each location, the curvature change amount, and the deflection distance of each of the bodies based on at least one of the determined information, the specified driving route, or a combination of the determined information and the specified driving route, and generate the deflection driving route by using at least part of the optimization state information.

According to an example, the kingpin angle may include a difference between a first heading direction of a first body and a second heading direction of a second body among the bodies at a point on the deflection driving route.

According to an example, the instructions, when executed by the controller, may cause the autonomous driving control apparatus to determine the optimization state information further based on a predefined maximum value and a predefined minimum value in correspondence to at least one of the location lateral error, the heading error, the kingpin angle, the curvature for each location, the curvature change amount, the deflection distance, or a combination of the location lateral error, the heading error, the kingpin angle, the curvature for each location, the curvature change amount, and the deflection distance.

According to an example, the instructions, when executed by the controller, may cause the autonomous driving control apparatus to determine that the host vehicle is driving along the deflection driving route if at least one of a first location lateral error of a first body, a second location lateral error of a second body, a first heading error of the second body, or a combination of the first location lateral error of the first body, the second location lateral error of the second body, and the first heading error of the second body among the bodies satisfies a specified condition.

According to an example, the instructions, when executed by the controller, may cause the autonomous driving control apparatus to determine at least one of a first offset state for a first body, a second offset state for a second body, or a combination of the first offset state and the second offset state among the bodies based on at least one of the determined information, the specified driving route, or a combination of the determined information and the specified driving route and to generate the deflection driving route so as to be adjacent to a center of the driving road, based on at least one of the first offset state, the second offset state, or a combination of the first offset state and the second offset state.

According to an example of the present disclosure, an autonomous driving control method includes determining, by a controller, curvature of a driving road on which a host vehicle is driving while controlling the host vehicle based on a specified driving route, determining, by the controller, information about at least one of the driving road, both lines of the driving road, a feature of the host vehicle, a kingpin angle between bodies of the host vehicle, or a combination of the driving road, the both lines of the driving road, the feature of the host vehicle, and the kingpin angle between the bodies of the host vehicle by using a sensor device if the curvature exceeds reference curvature, generating, by the controller, a deflection driving route based on at least one of the determined information, the specified driving route, or a combination of the determined information and the specified driving route, and allowing, by the controller, the host vehicle to drive on the driving road along the deflection driving route.

According to an example, the information about the both lines may include information about a left line and a right line based on a driving direction of the host vehicle. For example, the generating, by the controller, of the deflection driving route based on the at least one of the determined information, the specified driving route, or the combination of the determined information and the specified driving route may include determining, by the controller, a distance between the host vehicle and each of the left line and the right line, which are expected if the host vehicle continues to drive on route, based on the determined the specified driving information, and generating, by the controller, the deflection driving route based on the distance.

According to an example, the generating, by the controller, of the deflection driving route based on the at least one of the determined information, the specified driving route, or the combination of the determined information and the specified driving route may include determining, by the controller, optimization state information including at least one a location lateral error, a heading error, a kingpin angle, curvature for each location, a curvature change amount, a deflection distance based on the specified driving route, or a combination of the location lateral error, the heading error, the kingpin angle, the curvature for each location, the curvature change amount, and the deflection distance of each of the bodies based on at least one of the determined information, the specified driving route, or a combination of the determined information and the specified driving route, and generating, by the controller, the deflection driving route by using at least part of the optimization state information.

According to an example, the autonomous driving control method may further include determining, by the controller, the optimization state information further based on a predefined maximum value and a predefined minimum value in correspondence to at least one of the location lateral error, the heading error, the kingpin angle, the curvature for each location, the curvature change amount, the deflection distance, or a combination of the location lateral error, the heading error, the kingpin angle, the curvature for each location, the curvature change amount, and the deflection distance.

According to an example, the autonomous driving control method may further include determining, by the controller, that the host vehicle is driving along the deflection driving route if at least one of a first location lateral error of a first body, a second location lateral error of a second body, a first heading error of the second body, or a combination of the first location lateral error of the first body, the second location lateral error of the second body, and the first heading error of the second body among the bodies satisfies a specified condition.

According to an example, the generating, by the controller, of the deflection driving route based on the at least one of the determined information, the specified driving route, or the combination of the determined information and the specified driving route may include determining, by the controller, at least one of a first offset state for a first body, a second offset state for a second body, or a combination of the first offset state and the second offset state among the bodies based on at least one of the determined information, the specified driving route, or a combination of the determined information and the specified driving route, and generating, by the controller, the deflection driving route so as to be adjacent to a center of the driving road, based on at least one of the first offset state, the second offset state, or a combination of the first offset state and the second offset state.

According to an example of the present disclosure, in a computer-readable recording medium including a program for executing an autonomous driving control method, the autonomous driving control method includes determining, by a controller, curvature of a driving road on which a host vehicle is driving while controlling the host vehicle based on a specified driving route, determining, by the controller, information about at least one of the driving road, both lines of the driving road, a feature of the host vehicle, a kingpin angle between bodies of the host vehicle, or a combination of the driving road, the both lines of the driving road, the feature of the host vehicle, and the kingpin angle between the bodies of the host vehicle by using a sensor device if the curvature exceeds reference curvature, generating, by the controller, a deflection driving route based on at least one of the determined information, the specified driving route, or a combination of the determined information and the specified driving route, and allowing, by the controller, the host vehicle to drive on the driving road along the deflection driving route.

According to an example, the information about the both lines may include information about a left line and a right line based on a driving direction of the host vehicle. For example, the generating, by the controller, of the deflection driving route based on the at least one of the determined information, the specified driving route, or the combination of the determined information and the specified driving route may include determining, by the controller, a distance between the host vehicle and each of the left line and the right line, which are expected if the host vehicle continues to drive on the specified driving route, based on the determined information, and generating, by the controller, the deflection driving route based on the distance.

According to an example, the generating, by the controller, of the deflection driving route based on the at least one of the determined information, the specified driving route, or the combination of the determined information and the specified driving route may include determining, by the controller, optimization state information including at least one a location lateral error, a heading error, a kingpin angle, curvature for each location, a curvature change amount, a deflection distance based on the specified driving route, or a combination of the location lateral error, the heading error, the kingpin angle, the curvature for each location, the curvature change amount, and the deflection distance of each of the bodies based on at least one of the determined information, the specified driving route, or a combination of the determined information and the specified driving route, and generating, by the controller, the deflection driving route by using at least part of the optimization state information.

According to an example, the autonomous driving control method may further include determining, by the controller, the optimization state information further based on a predefined maximum value and a predefined minimum value in correspondence to at least one of the location lateral error, the heading error, the kingpin angle, the curvature for each location, the curvature change amount, the deflection distance, or a combination of the location lateral error, the heading error, the kingpin angle, the curvature for each location, the curvature change amount, and the deflection distance.

According to an example, the autonomous driving control method may further include determining, by the controller, that the host vehicle is driving along the deflection driving route if at least one of a first location lateral error of a first body, a second location lateral error of a second body, a first heading error of the second body, or a combination of the first location lateral error of the first body, the second location lateral error of the second body, and the first heading error of the second body among the bodies satisfies a specified condition.

The above description is merely an example of the technical idea of the present disclosure, and various modifications and variations may be made by one skilled in the art without departing from the essential characteristic of the present disclosure.

Accordingly, examples of the present disclosure are intended not to limit but to explain the technical idea of the present disclosure, and the scope and spirit of the present disclosure is not limited by the above examples. The scope of protection of the present disclosure should be construed by the attached claims, and all equivalents thereof should be construed as being included within the scope of the present disclosure.

Descriptions of an autonomous driving control apparatus according to an example of the present disclosure, and a method thereof are as follows.

According to at least one of examples of the present disclosure, an autonomous driving control apparatus may provide a function that allows each of bodies of a host vehicle to secure left and right clearance distances within a driving lane by controlling the host vehicle based on a deflection driving route that is relatively deflected compared to a driving route (e.g., a driving route created to follow the center of a driving lane) previously created for initial control of the host vehicle.

Moreover, the autonomous driving control apparatus may ensure safety by preventing the possibility of a collision in advance by controlling the host vehicle such that bodies included in the host vehicle are driving within a safe range from adjacent external objects (e.g., a road structure and/or another vehicle) on a driving lane.

Furthermore, according to at least one of examples of the present disclosure, efficiency in vehicle driving control may be secured such that the host vehicle moves to the center of the driving lane as close as possible by using a minimum offset value within a predetermined range in a process of changing the initially set specified driving route into a deflection driving route.

Besides, according to at least one of examples of the present disclosure, off-tracking issues that occur in some bodies of the host vehicle may be solved by controlling the host vehicle, by using a deflection driving route created based on an algorithm using various parameters.

Besides, a variety of effects directly or indirectly understood through the specification may be provided.

Hereinabove, although the present disclosure has been described with reference to examples and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus comprising:

a sensor device;

a memory configured to store instructions; and a controller operatively connected to the sensor device and the memory, wherein the instructions, when executed by the controller, cause the apparatus to:

determine, based on a driving route, curvature of a driving road on which a vehicle is driving;

determine, by the sensor device and based on whether the curvature exceeds a threshold curvature, information for driving of the vehicle, wherein the information for driving of the vehicle comprises at least one of:

the driving road;

lines of the driving road;

a vehicle characteristic of the vehicle; or a kingpin angle between bodies of the vehicle;

determine, based on at least one of the information for driving of the vehicle or the driving route, optimization state information;

generate a biased driving route within the lines of the driving road based on the optimization state information; and control the vehicle to drive on the driving road along the biased driving route.

2. The apparatus of claim 1, wherein information associated with the lines comprises a left line and a right line based on a driving direction of the vehicle, and wherein the instructions, when executed by the controller, cause the apparatus to:

based on the vehicle continuing to drive on the driving route and the determined information, determine expected distances:

between the bodies of the vehicle and the left line; and between the bodies of the vehicle and the right line; and generate the biased driving route based on the expected distances.

3. The apparatus of claim 2, wherein the expected distances comprise at least one of:

a first distance between the left line and a first body of the vehicle;

a second distance between the left line and a second body of the vehicle;

a third distance between the right line and the first body of the vehicle; or a fourth distance between the right line and the second body of the vehicle.

4. The apparatus of claim 1, wherein the optimization state information comprises at least one of:

a location lateral error;

a heading error;

the kingpin angle;

a curvature for a location of the driving road;

a curvature change amount; or a biased distance based on the driving route, wherein the biased distance is associated with each of the bodies based on at least one of the determined information or the driving route.

5. The apparatus of claim 1, wherein the kingpin angle comprises an angle formed between a first heading direction of a first body and a second heading direction of a second body, wherein the first and second bodies are among the bodies at a point on the biased driving route.

6. The apparatus of claim 4, wherein the instructions, when executed by the controller, cause the apparatus to:

determine the optimization state information further based on a predefined maximum value and a predefined minimum value that are based on at least one of:

the location lateral error;

the heading error;

the kingpin angle;

the curvature for the location;

the curvature change amount; or the biased distance.

7. The apparatus of claim 1, wherein the instructions, when executed by the controller, cause the apparatus to:

determine that the vehicle is driving along the biased driving route based on at least one of:

a first location lateral error of a first body of the bodies satisfying a condition;

a second location lateral error of a second body of the bodies satisfying the condition; or a first heading error of the second body satisfying the condition.

8. The apparatus of claim 1, wherein the instructions, when executed by the controller, cause the apparatus to:

determine, based on at least one of the determined information or the driving route, at least one of:

a first offset state for a first body of the bodies; or a second offset state for a second body of the bodies; and generate, based on at least one of the first offset state or the second offset state, the biased driving route so that the biased driving route is adjacent to a center of the driving road.

9. A method comprising:

determining, by a controller and based on a driving route, curvature of a driving road on which a vehicle is driving;

determining, based on whether the curvature exceeds a threshold curvature, information for driving of the vehicle, wherein the information for driving of the vehicle comprises at least one of:

the driving road;

lines of the driving road;

a vehicle characteristic of the vehicle; or a kingpin angle between bodies of the vehicle;

determining, based on at least one of the information for driving of the vehicle or the driving route, optimization state information;

generating a biased driving route within the lines of the driving road based on the optimization state information; and controlling the vehicle to drive on the driving road along the biased driving route.

10. The method of claim 9, wherein information associated with the lines comprises a left line and a right line based on a driving direction of the vehicle, and wherein the generating the biased driving route comprises:

based on the vehicle continuing to drive on the driving route and the determined information, determining expected distances:

between the bodies of the vehicle and the left line; and between the bodies of the vehicle the right line; and generating the biased driving route based on the expected distances.

11. The method of claim 9, wherein the optimization state information comprises at least one of:

a location lateral error;

a heading error;

the kingpin angle;

a curvature for a location of the driving road;

a curvature change amount; or a biased distance based on the driving route, wherein the biased distance is associated with each of the bodies based on at least one of the determined information or the driving route.

12. The method of claim 9, wherein the kingpin angle comprises an angle formed between a first heading direction of a first body and a second heading direction of a second body, wherein the first and second bodies are among the bodies at a point on the biased driving route.

13. The method of claim 11, wherein the determining the optimization state information comprises determining the optimization state information based on a predefined maximum value and a predefined minimum value that are based on at least one of:

the location lateral error;

the heading error;

the kingpin angle;

the curvature for the location;

the curvature change amount; or the biased distance.

14. The method of claim 9, further comprising:

determining that the vehicle is driving along the biased driving route based on at least one of:

a first location lateral error of a first body of the bodies satisfying a condition;

a second location lateral error of a second body of the bodies satisfying the condition; or a first heading error of the second body satisfying the condition.

15. The method of claim 9, wherein the generating the biased driving route comprises:

determining, based on at least one of the determined information, at least one of:

a first offset state for a first body of the bodies or a second offset state for a second body of the bodies; and generating, based on at least one of the first offset state or the second offset state, the biased driving route so that the biased driving route is adjacent to a center of the driving road.

16. A non-transitory computer-readable recording medium storing a program, when executed, cause:

determining, by a controller and based on a driving route, curvature of a driving road on which a vehicle is driving;

determining, based on whether the curvature exceeds a threshold curvature, information for driving of the vehicle, wherein the information for driving of the vehicle comprises at least one of:

the driving road;

both lines of the driving road;

a vehicle characteristic of the vehicle; or a kingpin angle between bodies of the vehicle;

determining, based on at least one of the information for driving of the vehicle or the driving route, optimization state information;

generating a biased driving route within the lines of the driving road based on the optimization state information; and controlling the vehicle to drive on the driving road along the biased driving route.

17. The non-transitory computer-readable recording medium of claim 16, wherein information associated with the lines comprises information associated with a left line and a right line based on a driving direction of the vehicle, and wherein the generating the biased driving route comprises:

based on the vehicle continuing to drive on the driving route and the determined information, determining expected distances:

between the bodies of the vehicle and the left line; and between the bodies of the vehicle the right line; and generating the biased driving route based on the expected distances.

18. The non-transitory computer-readable recording medium of claim 16, wherein the optimization state information comprises at least one of:

a location lateral error;

a heading error;

the kingpin angle;

a curvature for a location of the driving road;

a curvature change amount; or a biased distance based on the driving route, wherein the biased distance is associated with each of the bodies based on at least one of the determined information.

19. The non-transitory computer-readable recording medium of claim 16, wherein the program, when executed, cause:

determining that the vehicle is driving along the biased driving route based on at least one of:

a first location lateral error of a first body of the bodies satisfying a condition;

a second location lateral error of a second body of the bodies satisfying the condition; or a first heading error of the second body satisfying the condition.

20. The apparatus of claim 1, wherein the instructions, when executed by the controller, cause the apparatus to:

generate, based on states of a plurality of bodies of the vehicle, the biased driving route.

* * * * *